(12) United States Patent
Andersen et al.

(10) Patent No.: US 8,930,805 B2
(45) Date of Patent: Jan. 6, 2015

(54) BROWSER PREVIEW

(75) Inventors: David M. Andersen, Charlotte, NC (US); Brandee Lynn Bunton, Charlotte, NC (US); Phillip L. Richards, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 720 days.

(21) Appl. No.: 12/509,023

(22) Filed: Jul. 24, 2009

(65) Prior Publication Data

US 2011/0022559 A1  Jan. 27, 2011

(51) Int. Cl.
| | |
|---|---|
| G06F 17/00 | (2006.01) |
| H04L 29/06 | (2006.01) |
| G06F 17/30 | (2006.01) |
| G06F 21/52 | (2013.01) |
| G06F 21/56 | (2013.01) |

(52) U.S. Cl.
CPC ........ H04L 63/145 (2013.01); G06F 17/30905 (2013.01); G06F 21/52 (2013.01); G06F 21/563 (2013.01); H04L 63/1483 (2013.01)
USPC .............................. 715/234; 715/239; 726/23

(58) Field of Classification Search
CPC ... G06F 17/30861; G06F 21/53; G06F 21/51; G06F 17/30905
USPC .............. 715/234, 237, 239; 709/227; 726/23
See application file for complete search history.

(56) References Cited

U.S. PATENT DOCUMENTS

| | | | |
|---|---|---|---|
| 5,623,600 A | 4/1997 | Ji et al. | |
| 6,035,330 A * | 3/2000 | Astiz et al. | 709/218 |
| 6,092,194 A | 7/2000 | Touboul | |
| 6,615,266 B1 * | 9/2003 | Hoffman et al. | 709/227 |
| 6,701,350 B1 * | 3/2004 | Mitchell | 709/217 |
| 7,464,326 B2 * | 12/2008 | Kawai et al. | 715/205 |
| 7,707,546 B2 * | 4/2010 | Martinez et al. | 717/109 |
| 8,458,126 B2 * | 6/2013 | Sykes et al. | 707/610 |
| 2004/0215665 A1 * | 10/2004 | Edgar et al. | 707/200 |
| 2005/0229119 A1 * | 10/2005 | Torvinen | 715/864 |
| 2006/0105796 A1 * | 5/2006 | Malladi et al. | 455/522 |
| 2007/0113282 A1 * | 5/2007 | Ross | 726/22 |
| 2008/0077991 A1 * | 3/2008 | Wallman | 726/24 |
| 2008/0229427 A1 * | 9/2008 | Ramirez | 726/26 |
| 2008/0235385 A1 * | 9/2008 | Li | 709/229 |
| 2009/0064311 A1 * | 3/2009 | Clark et al. | 726/14 |

(Continued)

OTHER PUBLICATIONS

Eric Brown, Dreamweaver CS4 Beta: A Review, Jun. 2008, http://www.cmswire.com.*

(Continued)

*Primary Examiner* — Cesar Paula
*Assistant Examiner* — Howard Cortes
(74) *Attorney, Agent, or Firm* — Michael A. Springs; Moore and Van Allen, PLLC; Patrick B. Horne

(57) ABSTRACT

In general, embodiments of the invention relate to systems, methods, and computer program products for previewing, in a safe environment, a given web page that is or may be conducting dangerous or fraudulent activity, including malware distribution and phishing activity. More particularly, embodiments of the invention relate to previewing a given web page in a safe environment by obtaining and breaking down the source code behind the given web page and constructing a preview of the web page without any potentially harmful images, scripts, executables, and/or the like.

21 Claims, 6 Drawing Sheets

(56) References Cited

U.S. PATENT DOCUMENTS

| | | | |
|---|---|---|---|
| 2009/0070873 A1* | 3/2009 | McAfee et al. | 726/23 |
| 2009/0157675 A1 | 6/2009 | Stellhorn et al. | |
| 2009/0158141 A1* | 6/2009 | Bauchot et al. | 715/239 |
| 2010/0017464 A1* | 1/2010 | Cheng et al. | 709/203 |

OTHER PUBLICATIONS

Web Link Validator, REL Software, Aug. 2007, http://www.relsoftware.com.*

Third Party Observations received by the European Patent Office, dated Nov. 18, 2011.

Keil et al. "Privoxy 3.0.8 User Manual"; Privoxy Developers, Jan. 19, 2008.

Mercer, Alan: "Configuring Watchguard Proxies: A Guideline to Supplementing Virus Protection and Policy Enforcement", SANS Institute 2003, Sep. 5, 2003, pp. 9-14.

Juniper Networks: "Stopping Inbound and Outbound Threats with Juniper Networks Content Security"; Juniper Networks 2006, pp. 1-5.

Search Report and Written Opinion of Singapore Application No. 201005292-6; dated Dec. 15, 2011.

U.S. Appl. No. 12/433,398, filed Apr. 30, 2009.

Hungarian Intellectual Property Office. Second Written Opinion dated May 7, 2012. Singapore Application No. 201005292-6. Name of Applicant: Bank of America Corporation. English Language. 8 pages. Received Jun. 25, 2012.

European Search Report dated Jan. 23, 2013 for Application No. 10251327.2.

Singapore Examination Report dated Oct. 28, 2013 for Application No. 201005292-6.

* cited by examiner

500

540

URL ANALYSIS (CONTINUED)

LINKS

| TAG | ATTRIBUTE | DESTINATION |
|---|---|---|
| LINK | HREF | HTTP://WWW.xxxxxxx.xxxxxxx |
| IMG | SRC | HTTP://WWW.xxxxxxx.xxxxxxx |
| A | HREF | HTTP://WWW.xxxxxxx.xxxxxxx |
| A | HREF | HTTP://WWW.xxxxxxx.xxxxxxx |
| A | HREF | HTTP://WWW.xxxxxxx.xxxxxxx |
| A | HREF | HTTP://WWW.xxxxxxx.xxxxxxx |
| FORM | ACTION | HTTP://WWW.xxxxxxxx.xxxxxxx |
| FORM | ACTION | HTTP://WWW.xxxxxxx.xxxxxxx |
| A | HREF | HTTP://WWW.xxxxxxx.xxxxxxx |
| A | HREF | HTTP://WWW.xxxxxxx.xxxxxxx |
| A | HREF | HTTP://WWW.xxxxxxx.xxxxxxx |
| A | HREF | HTTP://WWW.xxxxxxx.xxxxxxx |
| A | HREF | HTTP://WWW.xxxxxxx.xxxxxxx |

544

550

SOURCE CODE

SOURCE CODE

FIG. 5B

BROWSER PREVIEW

FIELD

In general, embodiments of the invention relate to systems, methods, and computer program products for previewing a web page in a safe environment without images, hazardous scripts, and/or other executable objects.

BACKGROUND

Over the course of the past two decades, society has come to be heavily reliant on the Internet. The Internet is a global network of interconnected computers, enabling users to share information along multiple channels. Unfortunately, not all of the shared information is beneficial. In fact, a large number of computers connected to the global network provide fraudulent or dangerous material to the rest of the network. One type of dangerous material is malware. The term "malware" is a derivation of the terms "malicious" and "software." As the term would ordinarily indicate, malware is software designed to infiltrate or damage a computer system without the owner's knowledge or consent, although the term is generally understood to include a variety of forms of hostile, intrusive, or annoying software or program code, including computer viruses, worms, trojan horses, spyware, and the like.

Malware can be installed on vulnerable computers in many ways. Simply accessing a website can expose a user's computer to information including, source code, images, cookies, and the like. In a similar instance, malware may infect a system by exploiting bugs found within the memory of an operating system. In the case of malicious sites, accessing the site could immediately prompt the user's computer to receive malware into the system memory. In another instance, malware may infiltrate a system when an email attachment is opened. In these cases, malware can be distributed along with a complimentary device that is also malicious.

One such example of a complimentary malicious activity is phishing. At its most basic, phishing is the process of attempting to acquire sensitive user information, such as user names, passwords, or credit card details by masquerading as a trustworthy entity in an electronic communication. Phishing has become a growing public concern, and unfortunately, the act can take a variety of forms and methods. In one example, a "phisher" can contact an internet user through an email soliciting personal or financial information. The contact email can often resemble a communication from a well-known entity with whom the user has a pre-existing relationship. The fake email can solicit the user to either directly enter sensitive information, such as a credit card number, PIN number, password, or the like, in a reply email or in some instances to follow a link to a fake website where sensitive information would be requested. This fake website often mirrors the website of the well-known entity the phisher is attempting to resemble. In one example, the soliciting email would appear to be from the user's bank or any other entity with whom the user has an account. The emails sent by phishers often appear to be completely legitimate.

In addition to the danger of the phishing scheme itself, malware could be included in the attempt. The phishing email could contain malware objects or the fake website behind the phishing attempt could contain malware. In these instances, malware could be installed simply by visiting the fake website. As a result of the ease with which malware can infect an operating system, it is difficult for individuals and businesses to protect themselves from malicious software designers and phishers.

BRIEF SUMMARY

Generally, embodiments of the invention relate to systems, methods, and computer program products for safely previewing a website without images, scripts, or other executable objects. For example, in one embodiment of the invention, a computer program product is configured to receive data, such as an email containing a uniform resource locator (more commonly known as "URL"), and to construct a safe environment for viewing the web page associated with the URL. In one embodiment, the computer program product is configured to construct this safe viewing environment by using a web proxy to access the source code related to the web page and by generating a preview of the web page without any images, scripts, or executables. As such, embodiments of the present invention allow an organization to safely view potentially dangerous and malicious websites without threat of infection.

For example, embodiments of the present invention provide an apparatus the apparatus having: (1) a network interface configured to communicate with a web server on a network and receive from the web server computer-readable web page code defining a web page; (2) a memory device having one or more rules stored therein; and (3) a processor communicably coupled to the network interface and the memory. The processor is, in one embodiment of the invention, configured to: (1) receive a web page identifier identifying the web page; (2) use the web page identifier and the network interface to contact the web server and receive the computer-readable web page code from the web server; and (3) generate a modified view of the web page based at least partially on the rules stored in the memory device and the computer-readable web page code received from the web server. In some embodiments of the apparatus, the network interface is configured to communicate with the web server via an anonymous web proxy server.

In some embodiments of the apparatus, the processor is configured to generate the modified view of the web page by creating computer-readable web page code that is based on, but different than, the computer-readable web page code received from the web server. In some embodiments of the apparatus, the processor is configured to provide the modified view of the web page to a display device for display of the modified view to a user. In some embodiments of the apparatus, the modified view of the web page does not include images, scripts, and executables that are in the web page.

In some embodiments of the apparatus, the rules identify particular portions of the computer-readable web page code and define different computer-readable web page code to replace at least some of the identified portions of the computer-readable web page code. For example, in one embodiment, the rules identify a portion of the computer-readable web page code related to the display of an image and provide different computer-readable web page code to display an image identifier in the modified view of the web page instead of the image itself. In some embodiments of the apparatus, the rules replace portions of the computer-readable web page code that are related to formatting with different computer-readable web page code that standardizes the formatting.

In some embodiments of the apparatus, the modified view of the web page includes web page metadata. In some embodiments of the apparatus, the modified view of the web page includes a list of links included in the web page. In some embodiments of the apparatus, the modified view of the web page includes a textual view of the computer-readable web page code received from the web server.

In some embodiments of the apparatus, the computer-readable web page code includes HyperText Markup Language (HTML). In some such embodiments, the rules identify HTML tags that indicate material that is to be displayed in the modified view. In some embodiments, the rules identify HTML tags that indicate material that is not to be displayed in the modified view.

Embodiments of the invention further provide a system including: (1) a first computer configured to select a web page identifier; (2) an application server configured to receive the web page identifier from the first computer; and (3) a proxy server configured to receive the web page identifier from the application server. In one embodiment of the system, the proxy server is configured to use the web page identifier to request a web page from a web page server. In one embodiment of the system, the proxy server is configured to then receive first source code from the web page server. In some embodiments of the system, the application server is configured to receive the first source code from the proxy server and, based on the first source code, construct second source code for displaying a modified view of the web page. In some embodiments, the first computer is configured to receive the second source code and use it to display the modified view of the web page.

In some embodiments of the system, the first computer is configured to receive the first source code and display the first source code along with the modified view of the web page. In some embodiments of the system, the modified view of the web page does not include scripts, images, or executables. In some embodiments of the system, the proxy server is an anonymous web proxy server.

Embodiments of the invention also provide a method, the method involving: (1) receiving, electronically through a communication interface, a web page identifier identifying a web page; (2) using the web page identifier and the communication interface to contact a web server and receive computer-readable web page code from the web server; and (3) using a processor to generate a modified view of the web page based at least partially on rules stored in a memory device and the computer-readable web page code received from the web server, wherein the processor is configured to generate modified views of web pages based at least partially on rules stored in a memory device and computer-readable web page code received from web servers.

In some embodiments of the method, using the web page identifier and the communication interface to contact a web server includes communicating with the web server via an anonymous web proxy server. In some embodiments of the method, using a processor to generate a modified view of the web page includes using the processor to create computer-readable web page code that is based on, but different than, the computer-readable web page code received from the web server.

In some embodiments, the method further includes displaying the modified view of the web page without images, scripts, and executables that are in the web page. In some embodiments, the method involves the processor using the rules to identify particular portions of the computer-readable web page code and define different computer-readable web page code to replace at least some of the identified portions of the computer-readable web page code. In some embodiments, the method involves providing web page metadata along with the modified view of the web page. In some embodiments, the method involves providing a list of links included in the web page along with the modified view of the web page. In some embodiments, the method involves using the processor to identify HTML tags that indicate material that is to be displayed in the modified view. In some embodiments, the method involves using the processor to identify HTML tags that indicate material that is not to be displayed in the modified view.

BRIEF DESCRIPTION OF THE DRAWINGS

Figure 1:
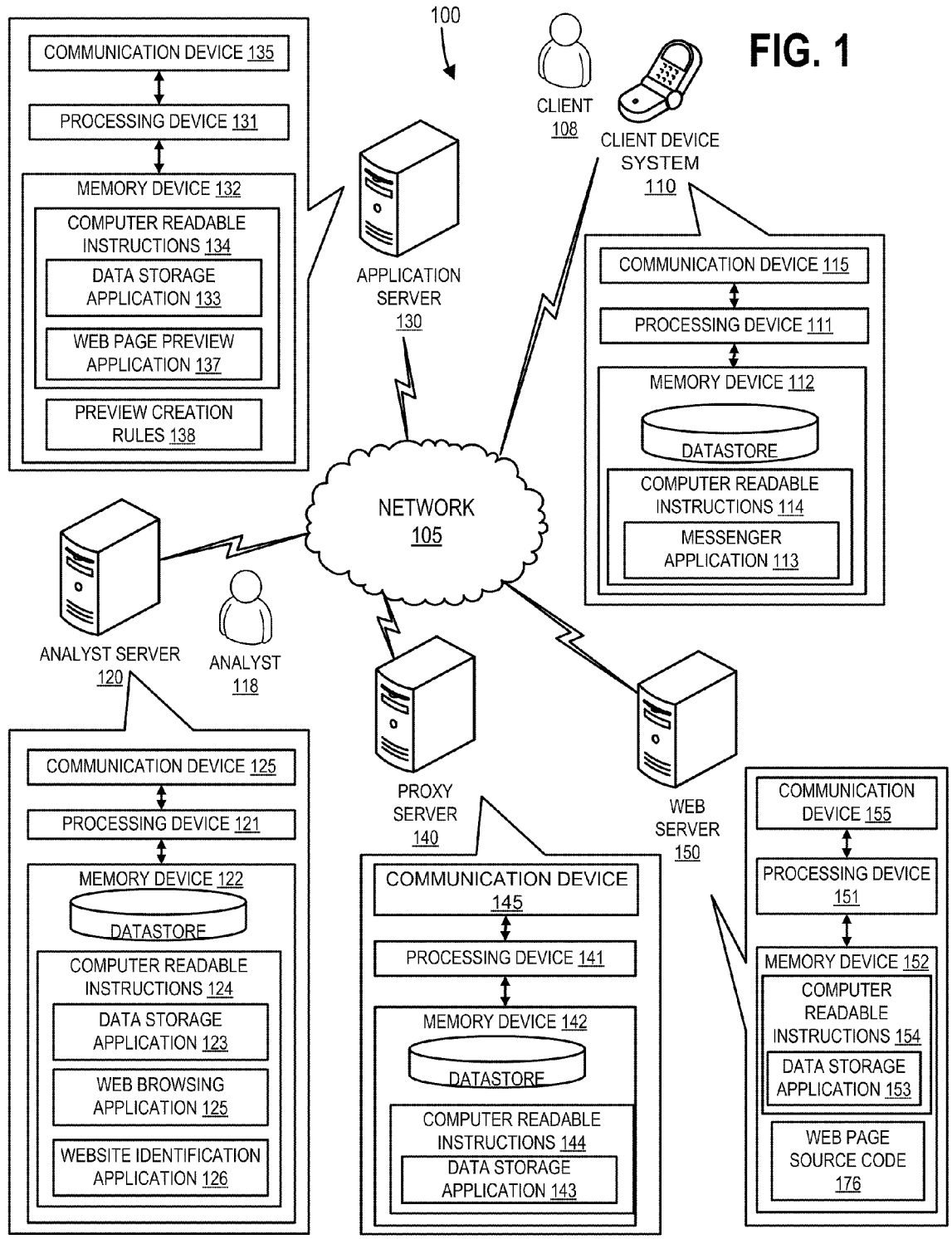
Figure 2:
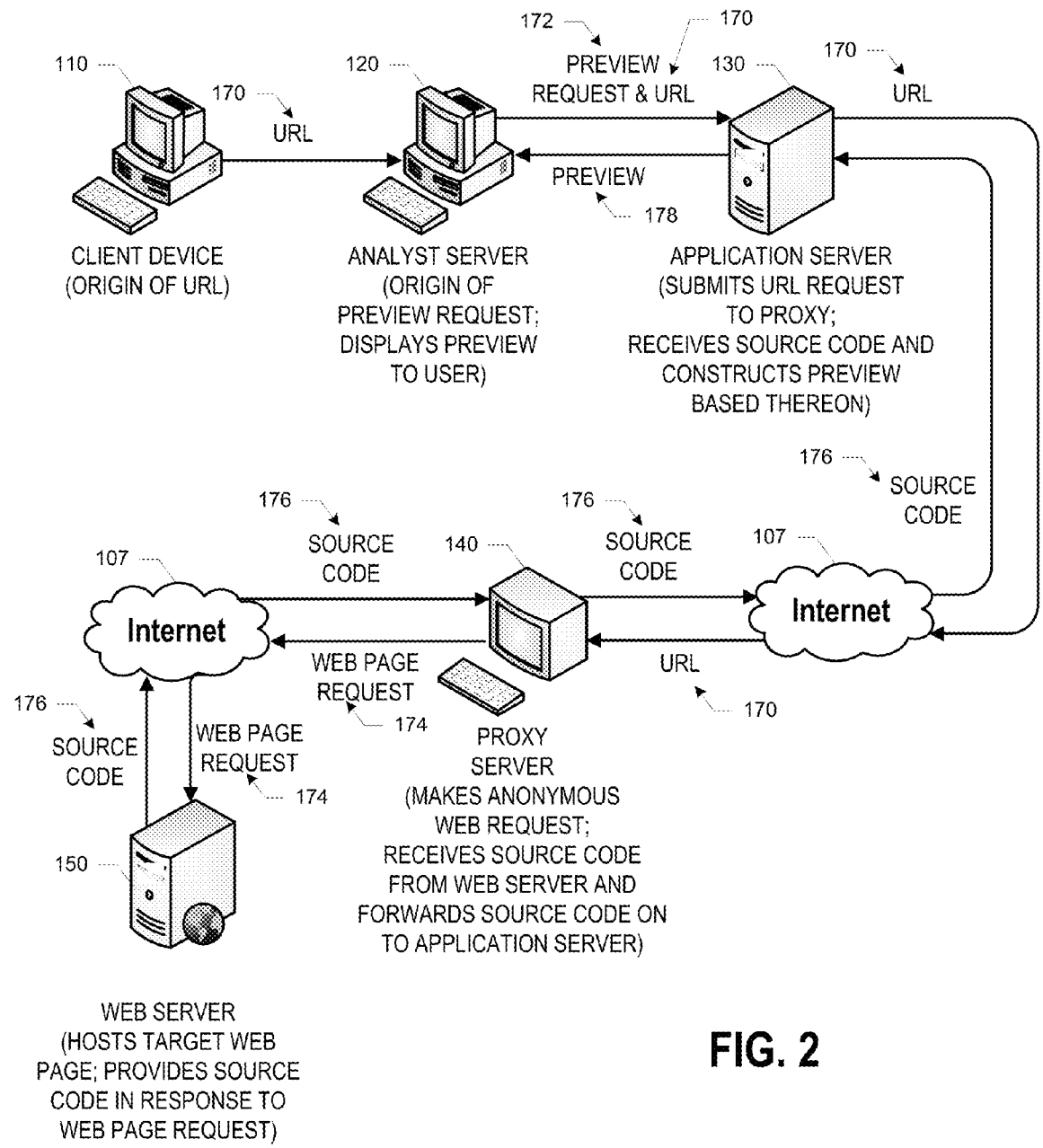
Figure 3:
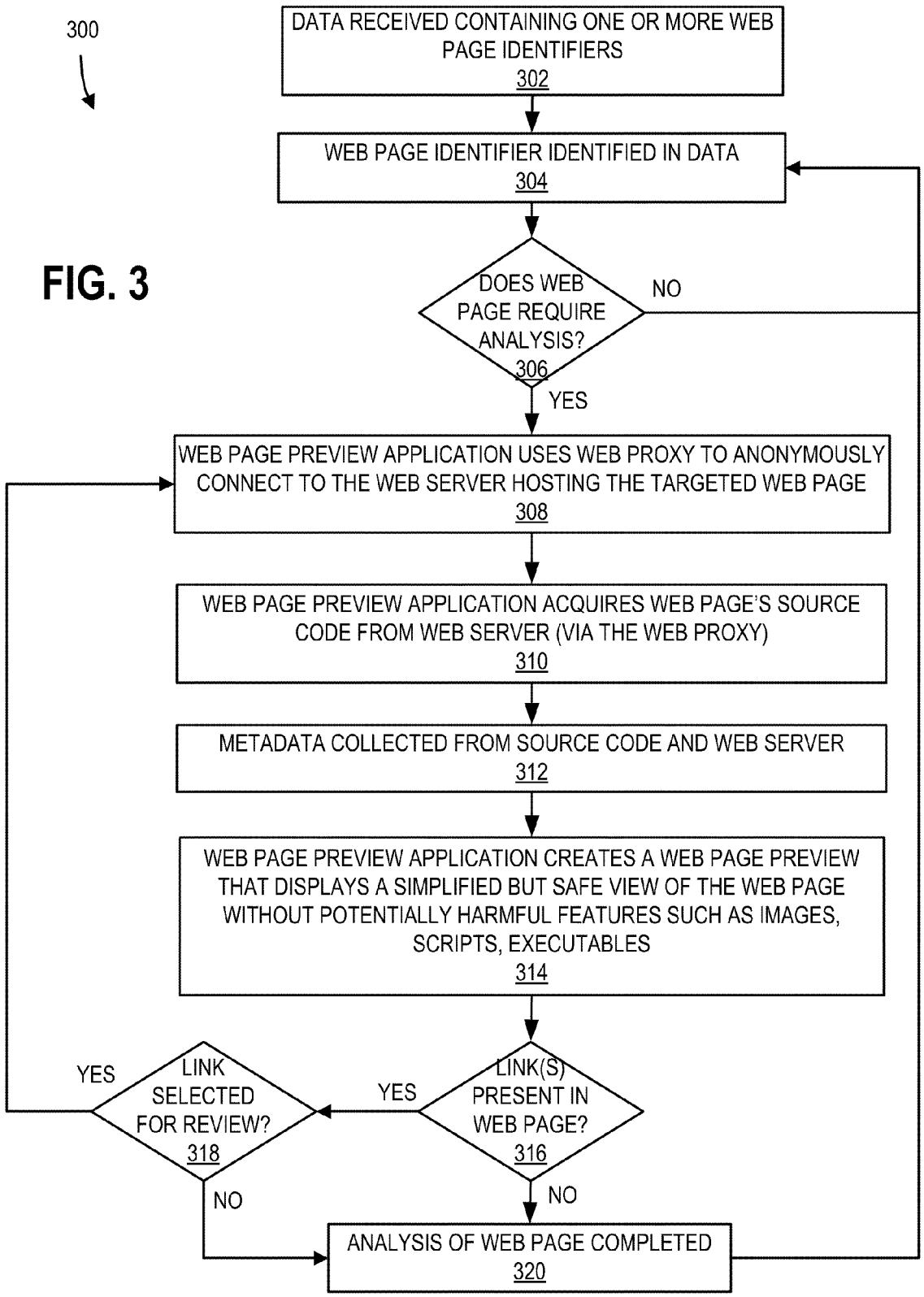
Figure 4:
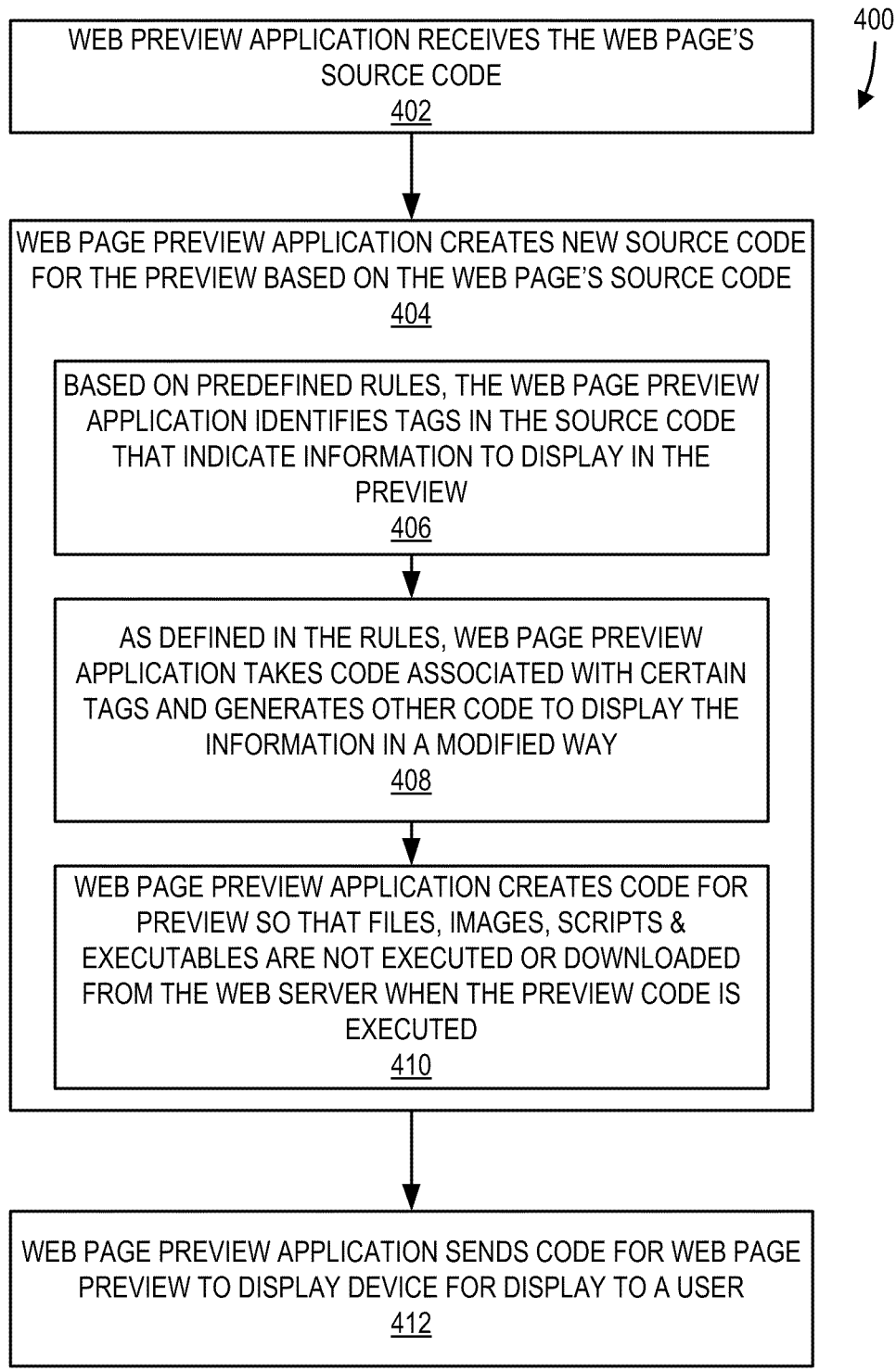
Figure 5A:
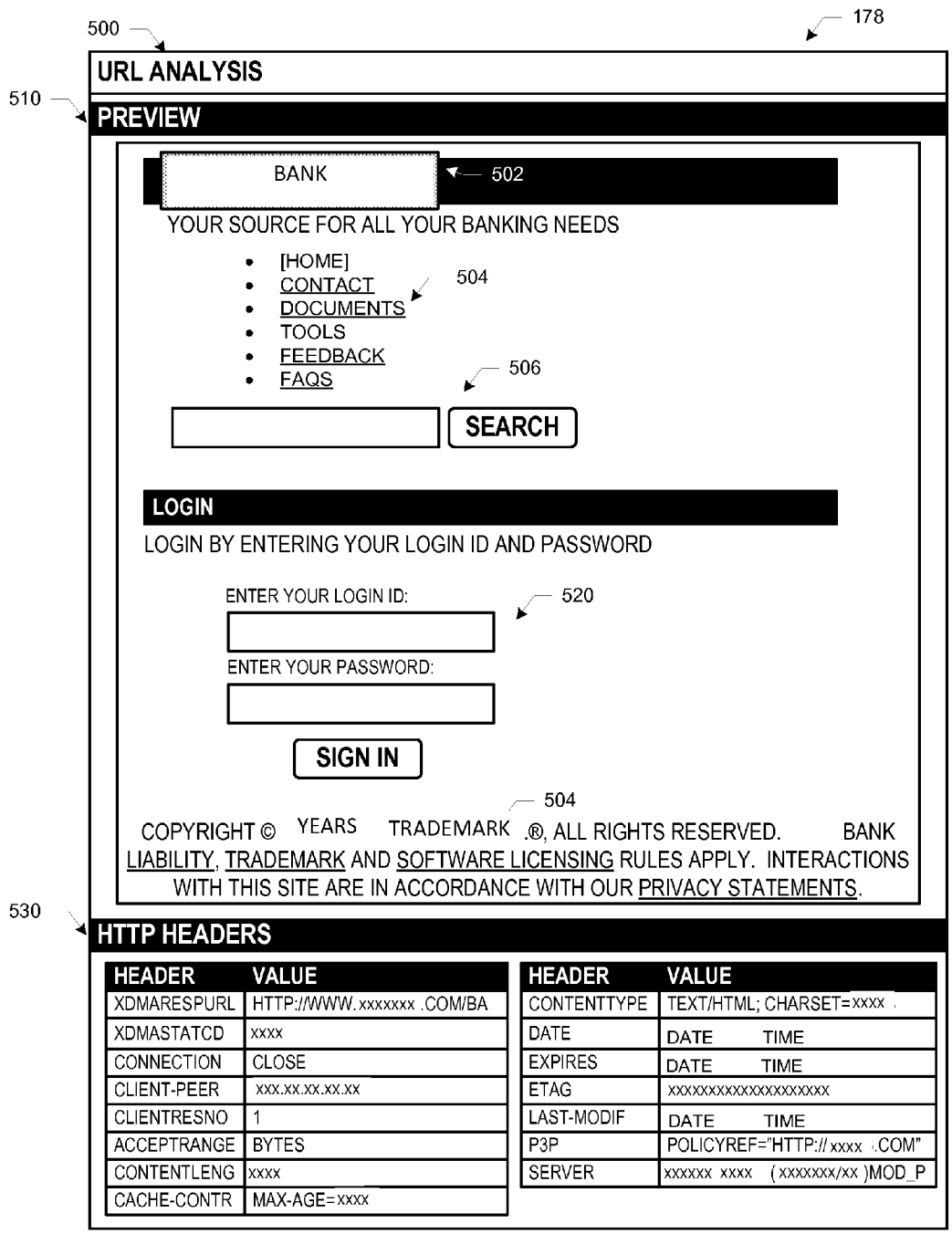

Having thus described embodiments of the invention in general terms, reference will now be made the accompanying drawings, wherein:

FIG. 1 is a functional block diagram illustrating devices involved in an embodiment of the invention;

FIG. 2 is flow diagram illustrating the flow of information between the devices of FIG. 1, in accordance with an embodiment of the invention;

FIG. 3 is a flow diagram illustrating a process for analyzing received data referencing web pages, in accordance with an embodiment of the invention;

FIG. 4 is a flow diagram illustrating a process for generating a web page preview, in accordance with an embodiment of the invention;

FIG. 5A illustrates a view of a first portion of a web page preview, in accordance with an embodiment of the invention; and FIG. 5B illustrates a view of a second portion of the web page preview, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Like numbers refer to like elements throughout.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable computer readable medium may be utilized. The computer readable medium may be, for example but not limited to, an electronic, magnetic, optical, electromagnetic, infrared, or semiconductor system, apparatus, device, or medium. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described below with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

As described above, it is important to be able to view potentially threatening websites, including those involved in phishing schemes, in a safe environment in order to be able to determine whether the website is, in fact, threatening. To that end, various aspects of the systems and methods described herein are directed toward viewing potentially threatening websites in a safe environment, without, for example, images, scripts, executables, or other website features that may contain malware. In some embodiments, automated protocols are provided for analyzing incoming data in order to determine which sites are likely threatening or malicious.

In general, many of the example embodiments of the invention described herein are directed toward a particular implementation where data related to a web page in question is collected from one of a variety of potential sources and used to construct a safe, or at least safer, preview of the web page without, for example, images, scripts, or executables. The safe preview of the web page may be used to more definitively determine the existence or absence of a threat within the web page in question. It should be appreciated that, after a preview of the web page has been safely constructed and reviewed, actions—other than or in addition to those mentioned above—could be taken to neutralize such a threat.

Turning to FIG. 1, there is shown a block diagram illustrating an exemplary operating environment 100 in which the invention may be implemented in accordance with one embodiment of the invention. The operating environment 100 is only one example of a suitable operating environment and is not intended to suggest any limitation as to the scope of use or functionality of other embodiments of the present invention. Thus, other environments and configurations apparent to one of ordinary skill in the art in view of this disclosure may be employed without departing from the scope or spirit of embodiments of the present invention.

As shown in FIG. 1, a network 105 interconnects a client device system 110, an analyst server 120, an application server 130, a proxy server 140, and a web server 150. The client device system 110 is in communication with the analyst server 120, the web server 150, and, in some embodiments, the application server 130, through the network 105. The analyst server 120, the application server 130, the proxy server 140, and the web server 150 may also be in communication with each other through the network 105.

The operating environment 100 described above generally operates in a networked environment using logical connections to one or more remote computers, such as a personal computer, a server, a router, a network personal computer, and/or any other peer device. The computers will typically include most, if not all, of the elements described above in relation to the computer readable medium. The logical connections could include a local area network (LAN), a wide area network (WAN), or any other wireless or wireline connection or network, such as the Internet, an intranet, and/or the like.

The client device system 110 includes any computing device capable of receiving and sending a message over a network, such as the network 105, to and/or from another computing device. The set of client devices may include devices that are usually considered general purpose computing devices and typically connect to a network using a wired or wireless communication medium at one or more fixed locations. For example, the client device system 110 may include such devices as personal computers (PCs), laptop computers, multiprocessor systems, microprocessor-based or programmable consumer electronics, network PCs, workstations, and/or the like. However, the set of such devices may also include more-specialized mobile devices with limited capabilities that typically connect to other devices using a wireless communication medium. For example, the client device system 110 may include such devices as cell phones, smart phones, pagers, radio frequency devices, infrared devices, integrated devices combining one or more of the preceding devices, other mobile devices, and/or the like. In this regard, the client device system 110 may include any device that is capable of connecting to other devices using a wired or wireless communication medium such as a personal computer, personal digital assistant (PDA), POCKET PC, laptop, wearable computer, cell phone, and/or any other device that is equipped to communicate over a wired and/or wireless communication medium.

The client device system 110 generally includes a communication device 115, a processing device 111, and a memory device 112. The processing device 111 is operatively coupled to the communication device 115 and the memory device 112. As used herein, the term "processing device" generally includes circuitry used for implementing the communication and/or logic functions of a particular system. For example, a processing device 111 may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 111 may include functionality to operate one or more software programs based on computer-executable program code thereof, which may be stored in the memory device 112. As used herein, a "memory device" or simply "memory" refers to a device including one or more forms of computer-readable media as defined herein.

The processing device 111 uses the communication device 115 to communicate with the network 105, and other devices on the network 105, including but not limited to the analyst server 120 and the web server 150. As used herein, a "communication device," such as communication device 115, generally includes a modem, server, and/or other device for communicating with other devices on the network 105, and/or a display, mouse, keyboard, touchpad, touch screen, microphone, speaker, and/or other user input/output device for communicating with one or more users.

The client device system 110 may further include a messenger application 113 that allows a user to perform a myriad of operations. For example, in one embodiment, the messenger application 113 is operable to send a message to, or receive a message from, another computing device. For example, messenger applications can include, but are not limited to, Short Message Service (SMS), Multimedia Messaging Service (MMS), Instant Messaging (IM), Internet Relay Chat (IRC), Jabber, email, and/or any other similar communication mechanisms.

Although FIG. 1 illustrates the client device system 110 as one system, it should be noted that there can be one or multiple systems with one or multiple applications, each with similar components that handle a number of functions related to client activity or other client systems. It should also be noted that each of the multiple systems can be in communication with each other through the network 105 and in communication with the analyst server 120, the application server 130, the web server 150, and/or other devices connected to the network 105.

The analyst server 120 generally includes a communication device 125, a processing device 121, and a memory device 122. The processing device 121 is operatively coupled to the communication device 125 and the memory device 122. The processing device 121 uses the communication device 125 to communicate with other devices on the network 105, including the client device system 110, the application server 130, and, in some embodiments, the web server 150. As such, the communication device 125 generally includes a modem, server, and/or other device for communicating with other devices on the network 105, and a display, mouse, keyboard, microphone, speaker, and/or other user input/output device for communicating with one or more users.

The analyst server 120 further includes computer-executable program code stored in the memory device 122, which includes the computer-executable program code of a data storage application 123. The data storage application 123 is used to store data captured from any of the communication mechanisms recognized by the communication device 125, including email, IM, or any similar communication mechanism, in a secure location for later access. The analyst server 120 may further include web browsing application 125 that allows a user to view HTML or other web-based content. In embodiments where the web page preview is generated using HyperText Markup Language (HTML) or other web-based languages and/or protocols, then the web browsing application 125 may be used to view and/or interact with the web page preview. Examples of web browsing applications include but are not limited to Internet Explorer™, Netscape™, Firefox™, Mozilla™, Chrome™, Opera™, and/or the like.

The analyst server 120 may further include a messaging application (not shown) that allows a user to perform a myriad of operations. For example, the messenger application may be operable to send a message to, or receive a message from, another computing device. Messenger applications can include, but are not limited to, Short Message Service (SMS), Multimedia Messaging Service (MMS), Instant Messaging (IM), Internet Relay Chat (IRC), Jabber, email, or any other similar communication mechanism.

In one embodiment, the analyst server 120 further includes a website identification application 126. Like the data storage application 123 and other applications, the website identification application 126 includes computer-executable program code stored in the memory device 122 that, when executed by the processing device 121, instructs the processing device 121 to perform certain functions. The website identification application 126 is capable of receiving general data relating to a website or web page and identifying a specific website or web page based on the received data. The data used to identify a specific website could be of a variety of types, including, but not limited to, source code, HTML, XML, origin ISP, URL, digital signatures, SSL certificates, keywords, and/or any other web page identifying information.

For example, in one embodiment, the analysts server 120 is configured to receive emails from, for example, one or more client device systems 110 and analyze the emails to identify URLs or other web page identifying information contained therein. In one embodiment, the analysts server 120 receives a plurality of emails suspected of being associated with phishing or other malicious/fraudulent activity and is configured to rank which of the web pages identified in the emails have the highest likelihood of being fraudulent or malicious. A list of these web pages are then provided to an analyst and the analyst can request a safe preview of the web page so that the analyst can view a modified version of the web page without risk, or at least with a lower risk, of obtaining viruses or other malware.

Referring again to FIG. 1, the application server 130 is generally configured to create the web page previews in a safe way. The application server 130 generally includes a communication device 135, a processing device 131, and a memory device 132. The processing device 131 is operatively coupled to the communication device 135 and the memory device 132. The processing device 131 uses the communication device 135 to communicate with other devices on the network 105, including but not limited to the analyst server 120 and the proxy server 140. As such, the communication device 135 generally includes a modem, server, and/or other device for communicating with other devices on the network 105.

As further illustrated by FIG. 1, the application server 130 contains computer-executable program code stored in the memory device 132, which includes the computer-executable program code of a data storage application 133 and a web page preview application 137. The data storage application 133 is used to store data, such as email text, URLs, source code, HTML, or virtually any other information transferable over the network 105. The stored data may be captured from the analyst server 120, the proxy server 140, the web server 150, or the client device system 110. As discussed in more detail below, the web page preview application 137 is used to create a preview of a web page located on the web server 150 based on communications with and data received from the proxy server 140. The web page preview is considered safe, or at least safer, as it is free of certain features of the web page, such as images, scripts, and other executables, that may contain malware or result in malware being installed on a user's computer.

The proxy server 140 is generally configured to serve as an intermediary for communications between the application server 130 and the web server 150 so as to maintain the anonymity of the application server 130. Therefore, the proxy server 140 is, in some embodiments, located outside the businesses computer network, where a business is trying to access the web server 150. The proxy server 140 generally includes a communication device 145, a processing device 141, and a memory device 142. The processing device 141 is operatively coupled to the communication device 145 and the memory device 142. The processing device 141 uses the communication device 145 to communicate with other devices on the network 105, including but not limited to, the application server 130 and the web server 150. As such, the communication device 145 generally includes a modem, server, and/or other device for communicating with other devices on the network 105.

The proxy server 140 further contains computer-executable program code stored in the memory device 142, which includes the computer-executable program code of a data storage application 143. The data storage application 143 is used to store data captured from any of the communication mechanisms recognized by the communication device 145, such as email, IM, or any similar apparatus, in a secure location for later access. The data storage application 143 retains data of a variety of types, including data representing a website or a particular webpage or any data related to a website or webpage. Such data can include source code, HTML, Extensible Markup Language (XML), Graphics Interchange Format (gif) images, Joint Photographic Experts Group (jpeg) images, JavaScripts, VBScripts, web server metadata, and/or the like.

The web server 150 is also connected to the network 105. The web server 150 is often operated by an unknown entity. In some instances, the web server 150 represents the host of a threatening website, involved in dangerous activity, such as the distribution of malware, engagement in phishing schemes, or any similarly threatening activity. Although embodiments of the invention are generally described herein with respect to a threatening web server, embodiments of the invention are used with respect to threatening and non-threatening web servers alike since embodiments of the invention may be used to determine whether a web server 150 is or is not threatening.

The web server 150 generally includes a communication device 155, a processing device 151, and a memory device 152. The processing device 151 is operatively coupled to the communication device 151 and the memory device 152. The processing device 151 uses the communication device 155 to communicate with other devices on the network 105, including but not limited to, the client device system 110, the proxy server 140, and, in some embodiments, the analyst server 120. As such, the communication device 155 generally includes a modem, server, or other device for communicating with devices on the network 105.

In addition, the web server 150 includes network computing devices configured to provide various resources, including content and/or services, over the network 105. More specifically, the web server 150 may, in some instances, be a server that is configured to provide faulty, misleading, fraudulent, malicious, and/or dangerous computer programs or other information. In one embodiment, the web server 150 hosts a web page suspected of distributing malware to unsuspecting website visitors. In such an embodiment, the web server 150 could provide at least some malware content in the form of content that, on the surface, appears legitimate. In another embodiment, the web server 150 hosts a suspected phishing website. In such an embodiment, the web server 150 could provide at least some phishing content in the form of services or content that, on the surface, appears legitimate.

Typically, the web server 150 could provide a website with dangerous content designed to automatically download to a client device system 110 or other computer system. In such an embodiment, the user of the client device system 110 will generally access a web page hosted by the web server 150. The client device system 110 will receive source code 176, such as HTML code, from the web server 150 and a web browsing application stored on the client device system 110 will execute the source code 176 to display a web page on the display of the client device system 110. In some cases, the web browsing application executing the source code 176 will initiate a download of malware from the web server 150. The download may install on the client device system 110 and may begin running without warning or provocation. The client device system 110 may be provided with network links directing the user of the client device system 110 to the web server 150 by way of various communication systems which can include email, IM, web pages, text messages, and/or the like.

In another instance, the web server 150 could provide a web page having a user interface wherein the interface requests confidential or sensitive information from a user of a client device system 110. In one embodiment, the web server 150 could provide the user of the client device system 110 access to a seemingly legitimate website that asks the user to provide any of a variety of information, such as but not limited to, log-in information, credit card number, social security number, account number, password, passcode, medical information, answers to security questions, or any other type of sensitive data. Similar to the situation described above, the client device system 110 may be provided with network links to the web server 150 by way of various communication systems which can include email, IM, another server, or even other client devices.

Devices that may operate as the web server 150 include, but are not limited to, personal computers, desktop computers, multiprocessor systems, microprocessor-based or programmable consumer electronics, network PCs, servers, or similar devices or combinations of these and other devices. Further, while a single web server 150 is depicted for clarity, there may, in fact, be many web servers 150 located on the network 105. Furthermore, many other legitimate devices may communicate with the client device system 110 over the network 105 and, as described above, embodiments of the invention may create previews of legitimate and threatening web pages alike.

FIG. 2 provides a flow diagram illustrating the flow of information between the devices of FIG. 1, in accordance with an example embodiment of the invention. In the embodiment of the invention illustrated in FIG. 2, the client device 110 is one of many computers used by a business, its customers, or its employees. The illustrated embodiment of the invention involves the business trying to identify malicious websites that are attempting to perform malicious acts on the business's computers, customers, or employees. For example, in one embodiment, the client device 110, which may be an employee's or a customer's computer, receives a suspicious-looking email asking the reader to click on a link to a web page. The link may be represented by a URL 170 (Uniform Resource Locator) or some other web page identifier in the email.

The analyst server 120 receives the email containing the URL 170 (or other web page identifier) from the client device 110. For example, the user 108 of the client device 110 (which may be an employee or a customer of the business) may forward the email to the analyst server 120 or an intermediary device, or the analyst server 120 may intercept the email before, concurrently with, or after the client device 110 receives the email. In the illustrated embodiment, the analyst server 120 is configured to determine whether the email or accompanying URL 170 is suspicious. In one embodiment, the analyst server 120 identifies words or character strings in the email and/or in the URL 170 and compares, based on past experience regarding which character strings or keywords indicate a likelihood that the email or URL is malicious, ranks all of the emails and/or URLs that it receives based on the likelihood that each one is malicious. For example, U.S. patent application Ser. No. 12/433,398 to Richards, Mayer, and Andersen, and entitled PHISH PROBABILITY SCORING MODEL, which is hereby incorporated herein by reference, describes systems and methods for determining the likelihood that a given website, webpage, or email is conducting or is related to fraudulent activity, such as phishing activity. In some embodiments of the present invention, embodiments of the systems and methods described in the Ser. No. 12/433,398 application are used to determine which web pages are suspicious and, therefore, which web pages should be previewed, investigated, and/or not opened directly.

In other embodiments, other devices or methods are used by the analyst server 120 and the analyst 118 to determine which URLs should be previewed. For example, in one embodiment, all URLs are previewed. In other embodiments, other techniques are used for automatically or manually determining which URLs (or other web page identifiers) look suspicious and should be previewed. In some embodiments, the analyst server 120 automatically determines that a web page preview should be requested. In other embodiments, an analyst 118 makes the determination and, in some embodiments, is aided by the analyst server 120.

Once a URL 170 is identified and it is decided that it should be previewed in a safe environment, the analyst server 120, automatically or at the request of an analysts 118, initiates a preview request 172 requesting that a safe preview be generated of the web page associated with the selected URL 170. In the illustrated embodiment, the preview request 172 is received by the application server 130 which is configured to generate a safe preview 178 of the web page associated with the URL 170.

As illustrated in FIG. 2, in one embodiment of the invention, the application server 130 sends the URL 170 over the internet 107 to a web/HTTP proxy server 140. In one embodiment, the proxy server 140 is anonymizing in that it is located outside of the businesses network (e.g., on a network different from the network on which the analyst server 120 and the application server 130 are located) and does not provide an indication (such as an IP address) of the identity of the application server 130, analyst server 120, or client device 110 so as to maintain the anonymity of the device for which the proxy server 140 is serving as a proxy.

The anonymous web proxy server 140 then makes a web page/HTTP request 174 over the Internet to the threat web/HTTP server 150 for the web page associated with the URL 170. The web server 150 responds to the request by making the source code 176 (e.g., the HTML code) for the requested web page available to the proxy server 140. The proxy server 140 then forwards the source code 176 on to the application server 130.

The application server 130 receives the source code 176 and then constructs a safe preview 178 thereof. In this regard, the application server 130 creates a modified view of the web page that allows the user to get an idea for the look and feel of the web page and its content without having to download images or other files or run scripts or other executables, which may contain malicious code or other malicious devices. As described in greater detail below, in one embodiment, the application server 130 follows certain rules 138 stored in its memory, including, in some instances, white lists and/or black lists of HTML tags, to create a web page preview 178 from the source code 176 by using certain HTML code, ignoring other HTML code, and replacing some HTML code with other HTML code. In this way, the application server 130 generates a preview 178 of the web page based on the source code 176 of the web page. In one embodiment, the preview 178 is written using HTML and is configured to be displayed in a conventional web browser. In other embodiments, the preview 178 is written in other computer-readable code and can be viewed using other computer applications, such as a text viewer. In some embodiments, other information about the web page (i.e., "web page metadata") is included with the preview 178. In some embodiments, the source code 176 is also included with the preview 178 in textual form.

After the preview is created by the application server 130, the preview 178 is then sent to the analyst server 120 where the preview 178 is then displayed on a screen for a user 118 of the analyst server 120. By viewing the web page preview 178, the analyst 118 may be able to make a more definitive determination about whether the web page has malicious intentions and can then take further action based on the determination. For example, if the analyst 118 determines that the web page is malicious or fraudulent, the analyst 118 may take such actions as blocking the web page from the business's network, initiating legal or other proceeding to shut down the web page or pursue damages or penalties against the web page owner, and/or by taking other actions. In some embodiments, the analyst 118 may desire to pursue a link on the web page and identified in the web page preview 178. In one embodiment, the preview 178 makes the URL for the link available to the analyst 118 so that the analyst 118 can then request a web page preview for the web page associated with the link.

The operation of certain aspects of the invention will now be described with reference to the flow charts illustrated in FIGS. 3 and 4. In FIG. 3, a general flow diagram is provided for illustrating a process for viewing a webpage in a safe environment in accordance with one embodiment of the invention. More specifically, the process 300 represents an overview of a process for receiving information referencing a webpage, deconstructing the webpage, and subsequently reconstructing a preview of the web page without certain images, scripts, or executables. As described herein, the process 300 of FIG. 3 is, in one embodiment, implemented by various devices in the operating environment 100 described in FIG. 1. In other embodiments, however, the process 300 of FIG. 3 is implemented by a single computer that both receives the data containing a web page identifier and contains the web page preview application 125 for receiving source code from the web server 150 and constructing a safe web page preview therefrom.

Referring to FIG. 3, as represented by block 302, data is first received, the data containing one or more URLs, hyperlinks, and/or other web page identifiers. The data may be received at a computing device, such as at the client device system 110, analyst server 120, or application server 130 described above. Typically, data will be received over the network 105, which as described above may represent an intranet, a direct connection, or the Internet. The data being received may be of virtually any type and format, including, but not limited to, email, text message, PDF document, Word™ document, URL, source code, HTML, origin ISP, pictures, digital signatures, SSL certificates, proper protocols, data collected by the local client sources, or the like. Typically, the data will relate to a website generally or a specific web page of a website.

It is important to note that the data can be sent from any source connected to the network 105. In one embodiment, the data will be sent from the web server 150 or from another web server directly to client device 110, the analyst server 120, or the application server 130. In an alternative embodiment, however, the data will be sent to the analyst server 120 or the application server 130 from the client device system 110.

In the event data is sent from the client device system 110, in one embodiment, the data is sent by the client device system 110 automatically, or the analyst server 120 or application server 130 intercepts the data when it is sent to the client device system 110. In other embodiment, the data is sent by a user 108 of the client device system 110 based on individual discretion. For example, in one such an embodiment, the user may make this determination after having received a suspicious email or other data. For example, a user may receive an email containing a URL which the user, using his own discretion, deems to be potentially threatening. In this case, the user may forward the threatening email to the analyst server 120. Regardless of how the data is received, in each of these instances, the web server 150 or another web server seeks to induce a user to interact with the web server 150, in an attempt to spread harmful software, cull sensitive data from the user, and/or the like.

As discussed above, in some instances, data will be sent from the client device system 110 based on user discretion. Such a determination may be made based on a variety of factors available to the user, including, but not limited to, a misspelling within the web page, improper grammar, suspect graphics, questions, and/or the like. In addition, the client device system 110 is arranged to communicate with local client sources. Such local client sources include, but are not limited to, operating system components, anti-virus applications, browser components, client firewall components, or the like. Such sources may be configured to provide notice indicating that particular data or a URL is potentially dangerous. The danger may be indicated by notification that the URL or other data is being blocked, by highlighting the URL or other data in red, and/or by other mechanisms.

After the client 108 determines that a given piece of information is potentially dangerous, in one embodiment, the client 108 will send the data via the client device system 110 to the analyst server 120 where it is received in block 202. The client 108 may send only the data that the user has determined to be dangerous, or forward the information gathered by any other local client sources. For example, the client device system 110 may be arranged to collect URL information from local client sources. The sources may collect data concerning: a blocked URL; a specific time that the blocking occurred; a source of the message associate with the URL; a network address of the URL; information about whether the URL is associated with a received email message, a received text message, or is located within a webpage; or the like. This information, where is exists, may also be sent to the analyst server 120.

As represented by block 304, the data received in process block 302 is used to identify a web page identifier. This process can be accomplished in a variety of ways. In one embodiment where the data is received at the analyst server 120, the website identification application 126 analyzes the data in order to specifically locate a particular web address. In another embodiment, a human analyst can identify a particular web page identifier from the data by following location cues found within the data.

As represented by block 306 a decision is then made as to whether or not the identified web page requires further analysis. For example, the decision can be made by reviewing the received data against currently accepted, industry threat indicators. These indicators could include keywords associated with malicious program distribution, suspicious origin locations, or the like. It should be appreciated that nearly any evidence of a dangerous website could lead to further investigation. The decision can be made in numerous ways, including, but not limited to, a completely automated decision wherein the system can choose to continue analysis based on keywords and other previously defined signals or a partially automated decision wherein a human operator can use the system analysis to augment the decision-making process. In still other embodiments, the decision may be completely manual.

If it is determined that more analysis of an identified web page is not needed, then the process 300 returns to block 304 and another web page identifier is selected from the received data. If, however, the it is determined that more analysis of the web page should be performed, then the process 300 proceeds to block 308 where the web page preview application 137 uses a web proxy 150 to anonymously connect to the web server 150 that hosts the web page associated with the selected web page identifier. In one embodiment, the web page identifier is sent to the application server 130 where, in one embodiment, the web page preview application 137 is maintained. The web page preview application 137 then solicits the proxy server 140 to connect to the web server 150. The connection is considered remote because the proxy server 140 connects to the web server 150 only by command from the web page preview application 137. For example, in one embodiment, an HTTP request for the web page is sent from the application server 130 to the proxy server 140. The proxy server 140 then sends its own HTTP request for the web page to the web server 150. In this way, the web server 150 cannot see the identity of the application server 130.

The process 300 then proceeds to block 310 where the web page preview application 137 acquires the identified web page's source code 176 from the web server 150. In embodiments where a web proxy are used, the source code 176 is received from web server 150 via the proxy server 140. For example, in one embodiment, in response to the HTTP request sent by the proxy server 140 to the web server 150, the proxy server 140 receives source code 176 written in, for example, HTML and sent in accordance with HTTP (Hypertext Transfer Protocol). The proxy server 140 then send the source code 176 to the application server 130.

In one embodiment, as represented by block 312, the process 300 also involves the collection of metadata about the source code 176 and the web server 150. Some metadata about the source code 176 may be determined directly by the application server 130, but metadata about the web server 150 may, in some embodiments, be obtained through the proxy server 140 to maintain confidentiality of the application server 120. Metadata may include descriptive information about the context, quality and condition, or characteristics of the source code 176, including context, quality and condition, or characteristics of the web browser 150. This type of data is particularly useful with regard to internet websites. The HTML used to mark-up web pages allows for the inclusion of a variety of types of metadata, from simple descriptive text, dates and keywords to highly-granular information. Pages can be geotagged with coordinates or metadata may be included in the page's header or in a separate file. Metadata may include such information as the web server's IP addresses, the geographic location of the web server, the type of web server, when the web page was last modified, and/or the like.

As represented by block 314, the browser preview application 137 creates a web page preview 178 based on the web page's source code 176. When executed by a computer, the web page preview 178 displays a simplified, but safe, version of the web page. This version is simplified and safe in that certain potentially harmful scripts, executables, files and images that are called into play by the source code 176 are not downloaded or executed by the computer that displays the web page preview 178. This is because the application server 130 running the web page preview application 137 and based on certain preview creation rules 138 constructs new code for the web page preview, where the new web page preview code is made up of, for example, only safe portions of the source code 176 and safe replacements for some potentially harmful portions (e.g., downloads, images, executables, scripts, etc.) of the source code 176.

In some instances, as represented by decision block 316, there are hyperlinks or other links in the web page being examined. In one embodiment, the web page preview 178 displays the links to the user and, as represented by decision block 318, allows the user to request a preview of the web pages associated with one or more of these links. If the user requests a preview for one or more of the links, then the process 300 then proceeds back to block 308 where the web page preview application 137 determines uses the web proxy 140 to request the source code for the web page associated with the one or more selected links.

As represented by block 320, if there are no more links in the web page preview 178 and/or none of the links are selected for previewing, then the process 300 proceeds to block 304 where other web page identifiers are identified in received data. With regard to the analysis of the previewed web page(s), in one embodiment, a human analyst 118 reviews the web page preview(s) for dangerous material. The human analyst 118 uses individual knowledge and expertise to analyze each web page preview. The human analyst can use everything from previous experience to known industry standards relating to dangerous schemes, including, but not limited to, malware distribution and phishing schemes. In another embodiment, analysis of the potentially dangerous website can be fully or partially automated wherein the analyst server 120 is configured to identify dangerous sites based on certain keywords or other characteristics of the web page preview and/or on other data collected from the web server 150. It is apparent that analysis of the identified website can take place in various ways, and need not be limited to the examples described herein.

FIG. 4 is a flow diagram illustrating a process 400 for generating a web page preview 178, in accordance with an embodiment of the invention. In one embodiment, the process 400 is performed during step 314 of the process 300 illustrated in FIG. 3. This process is, in one embodiment, performed by a processor, such as but not limited to the processing device 131 of the application server 114, executing the web page preview application 137. As represented by block 402, the web page preview application 137 receives the source code 176 for the target web page.

As represented by block 404, the web page preview application 137 then creates, based on the web page's actual source code 176, new source code for a safe preview of the web page. As represented by block 406, in one embodiment, the code for the preview is created by first identifying portions of the source code, such as HTML tags, that indicate information in the source code that should be displayed in the preview. In one embodiment, this is based on certain preview creation rules 138, which may contain a list of known HTML tags or other known code character strings. In this way, any new and unknown tags or other code portions will be ignored making it difficult to design around the protections afforded by the preview application 137. In one embodiment, certain tags or other code portions are identified by the rules 138 as being harmless. In one embodiment, these harmless code portions that include information that should, according to the rules 138, be displayed in the web page preview are included in unmodified form in the source code for the web page preview. In some embodiments, however, even code representing seemingly harmless web page features may be replaced with modified code so as to standardize the web page previews across al web pages. For example, fonts, headers, colors, and/or the like may all be standardized in one embodiment of the invention.

As represented by block 408, in some embodiments, the web page preview application 137 then creates new code to display certain information in a modified way based on the rules 138. More particularly, in some embodiments, the rules 138 identify certain tags and/or other code portions that identify potentially harmful source code or links in the web page's original source code 176. In some embodiments, the rules 138 provide instructions for new source code to use in the preview in place of the original potentially harmful code or link so that the preview displays information about the code or link but in a modified and safer way. For example, in one embodiment the rules 138 identify the HTML image tag "<img>" as potentially harmful since it requires the downloading of an image from the web server 150 or another location on the web and, as such, may result in the downloading of a virus or other malware. For example, the source code 176 may include a line such as <img src="http://www.abcdefhacker.com/angry.gif" alt="Angry face"/>. This line of code instructs a normal web browser to download an image from the URL http://www.abcdefhacker.com/angry.gif display it on the web page and display the title "Angry face" when the user moves his or her cursor over the image. The rules 138 may instruct the web page preview application 137 to identify this code as potentially harmful because it contains an <img> tag and may instruct the web page preview application 137 to instead create new code for the web page preview 178 where the new code displays information about the image in the web page preview without downloading the image itself. For example, in one embodiment, for every image in the source code, the web page preview application 137 creates code that, when executed by a web browser, displays a gray box where the image would be located with the text of the URL and/or the alternate image title within the box. In this way, an analyst 118 viewing the web page preview 178 will know that the gray box represents an image and may know from the URL and/or the image title what the image likely refers to. The analyst 118 can then use the URL to access the image if he or she needs to do so.

In other embodiments, certain black listed tags or other code portions are simply not included in the preview at all. In still other embodiments, only white-listed tags or other code portions are included in the preview.

As represented by block 410, the web page preview application 137 creates code for the web page preview 178 so that images, files, scripts, and executables are not downloaded or executed when the web page preview code is executed. As represented by block 412, the web page preview application 137 then sends the code for the web page preview to a display device (of the same computer or another computer such as the analyst server 120) for display to a user, such as an analyst 118.

FIGS. 5A and 5B illustrate views of a first portion and a second portion, respectively, of a web page preview 178, in accordance with an embodiment of the invention. As illustrated in FIG. 5A, in one embodiment of the invention, a window 500 is displayed to the user and includes four sections: (1) web page preview section 510 having a modified view of the web page; (2) an HTTP headers section 530 having web page metadata; (3) a links section 540 having a list of the URLs or other links identified within the web page; and (4) a source code section 550 the web page's actual source code 176 but unexecuted and in textual form.

The exemplary web page illustrated in FIGS. 5A and 5B is a phishing web page attempting to emulate a banking website so as to obtain confidential login information from a user. As illustrated in the preview section 510 of FIG. 5A, in the illustrated embodiment, text from the web page is displayed. However, images have not been downloaded. In the illustrated embodiment, the text "YOUR HOME BANK" in a gray box 502 indicates that the actual web page has an image, probably a fake or copied bank logo, located at the top of the web page. In the illustrated embodiment, the title of the image is "YOUR HOME BANK" and the URL that would be used to download the image is listed in the links section 540 of FIG. 5B as entry 544 in the list of links. In this way, the analyst viewing the web page preview 500 can see that this web page is trying to emulate a bank but does not have to download the image which may contain malware. If the analyst 118 does desire to download the image, the analyst 118 has the URL listed in the links sections 540. The analyst 118 can also view the original source code 176 for the actual web page in section 550.

In the illustrated embodiment of the web page preview, hyperlinks associated with text or images in the actual web page are identified in the web page preview 500 by underlined text or image titles, such as hyperlinks 504. The URLs associated with these hyperlinks are listed in the links section 540. Forms, such as the search tool 506 and the login tool 520 are illustrated in the web page preview 500 but, in one embodiment, are not functional. URLs associated with these forms are also listed in the links section 540 of the web page preview 500.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. An apparatus comprising:
a network interface configured to communicate with a web server on a network and receive from the web server computer-readable web page code defining a web page;
a memory device comprising one or more rules stored therein, the one or more rules comprises one or more rules for identifying images, scripts and executables from the computer-readable web page code and further identifying at least a first portion of the images, scripts and executables not to be downloaded when a modified view of the web page is generated and further identifying at least a second portion of the images, scripts and executables not to be executed when the modified view of the web page is generated, wherein the first portion is different from the second portion;
a processor communicably coupled to the network interface and the memory, and configured to:
receive a web page identifier identifying the web page;
use the web page identifier and the network interface to contact the web server and receive the computer-readable web page code from the web server; and
generate the modified view of the web page based at least partially on the rules stored in the memory device and the computer-readable web page code received from the web server, wherein the modified view of the web page comprises:
a preview section comprising some or all the text of the web page, and comprising some or all the forms of the web page in a non-functional format, but not including the first portion and the second portion of the identified images, scripts and executables;
a source code section comprising the computer-readable webpage code in unexecuted and textual form; and
a link section separate from the preview section and the source code section, the link section comprising a list of links included in the web page, the list of links comprising one or more links associated with the forms of the web page.

2. The apparatus of claim 1, wherein the network interface is configured to communicate with the web server via an anonymous web proxy server.

3. The apparatus of claim 1, wherein the processor is configured to generate the modified view of the web page by creating computer-readable web page code that is based on, but different than, the computer-readable web page code received from the web server.

4. The apparatus of claim 1, wherein the processor is configured to provide the modified view of the web page to a display device for display of the modified view to a user.

5. The apparatus of claim 1, wherein the rules identify particular portions of the computer-readable web page code and define different computer-readable web page code to replace at least some of the identified portions of the computer-readable web page code.

6. The apparatus of claim 5, wherein the rules identify a portion of the computer-readable web page code related to the display of an image and provide different computer-readable web page code to display an image identifier in the modified view of the web page instead of the image itself.

7. The apparatus of claim 1, wherein the rules replace portions of the computer-readable web page code that are related to formatting with different computer-readable web page code that standardizes the formatting.

8. The apparatus of claim 1, wherein the modified view of the web page comprises web page metadata.

9. The apparatus of claim 1, wherein the modified view of the web page comprises a textual view of the computer-readable web page code received from the web server.

10. The apparatus of claim 1, wherein the computer-readable web page code comprises HyperText Markup Language (HTML).

11. The apparatus of claim 1, wherein the rules identify HTML tags that indicate material that is to be displayed in the modified view.

12. The apparatus of claim 1, wherein the rules identify HTML tags that indicate material that is not to be displayed in the modified view.

13. A system comprising:
a first computer configured to select a web page identifier;
an application server configured to receive the web page identifier from the first computer; and
a proxy server configured to receive the web page identifier from the application server,
wherein the proxy server is further configured to use the web page identifier to request a web page from a web page server,
wherein the proxy server is configured to receive first source code from the web page server,
wherein the application server is configured to receive the first source code from the proxy server and, based on the first source code and on one or more rules for identifying images, scripts and executables from the first source code and further identifying at least a first portion of the images, scripts and executables not to be downloaded when a modified view of the web page is constructed and further identifying at least a second portion of the images, scripts and executables not to be executed when the modified view of the web page is constructed, wherein the first portion is different from the second portion, construct second source code for displaying the modified view of the web page,
wherein the first computer is configured to receive the second source code and use it to display the modified view of the web page;
wherein the modified view of the web page comprises:
a preview section comprising some or all the text of the web page, and comprising some or all the forms of the web page in a non-functional format, but not including the first portion and the second portion of the identified images, scripts and executables;
a source code section comprising the first source code in unexecuted and textual form; and
a link section separate from the preview section and the source code section, the link section comprising a list of links included in the web page, the list of links comprising one or more links associated with the forms of the web page.

14. The system of claim 13, wherein the proxy server comprises an anonymous web proxy server.

15. A method comprising:
receiving, electronically through a communication interface, a web page identifier identifying a web page;
using the web page identifier and the communication interface to contact a web server and receive computer-readable web page code from the web server; and
using a processor to generate a modified view of the web page based at least partially on rules comprising one or more rules for identifying images, scripts and executables from the computer-readable web page code and further identifying at least a first portion of the images, scripts and executables not to be downloaded when the modified view of the web page is generated and further identifying at least a second portion of the images, scripts and executables not to be executed when the modified view of the web page is generated, wherein the first portion is different from the second portion, the rules stored in a memory device and the computer-readable web page code received from the web server, wherein the processor is configured to generate modified views of web pages based at least partially on rules stored in a memory device and computer-readable web page code received from web servers, wherein the modified view of the web page comprises:
a preview section comprising some or all the text of the web page, and comprising some or all the forms of the web page in a non-functional format, but not including the first portion and the second portion of the identified images, scripts and executables;
a source code section comprising the computer-readable webpage code in unexecuted and textual form; and
a link section separate from the preview section and the source code section, the link section comprising a list of links included in the web page, the list of links comprising one or more links associated with the forms of the web page.

16. The method of claim 15, wherein using the web page identifier and the communication interface to contact a web server comprises communicating with the web server via an anonymous web proxy server.

17. The method of claim 15, wherein using a processor to generate a modified view of the web page comprises using the processor to create computer-readable web page code that is based on, but different than, the computer-readable web page code received from the web server.

18. The method of claim 15, further comprising the processor using the rules to identify particular portions of the computer-readable web page code and define different computer-readable web page code to replace at least some of the identified portions of the computer-readable web page code.

19. The method of claim 15, further comprising providing web page metadata along with the modified view of the web page.

20. The method of claim 15, using the processor to identify HTML tags that indicate material that is to be displayed in the modified view.

21. The method of claim 15, using the processor to identify HTML tags that indicate material that is not to be displayed in the modified view.

\* \* \* \* \*